(12) United States Patent
Sasagawa et al.

(10) Patent No.: US 6,833,413 B2
(45) Date of Patent: Dec. 21, 2004

(54) BLOCK COPOLYMER AND COMPOSITION CONTAINING THE COPOLYMER

(75) Inventors: Masahiro Sasagawa, Kanagawa (JP); Shigeki Takayama, Tokyo (JP); Shigeo Nakajima, Kanagawa (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 108 days.

(21) Appl. No.: 10/030,246

(22) PCT Filed: May 8, 2001

(86) PCT No.: PCT/JP01/03847

§ 371 (c)(1),
(2), (4) Date: Jan. 9, 2002

(87) PCT Pub. No.: WO01/85818

PCT Pub. Date: Nov. 15, 2001

(65) Prior Publication Data

US 2002/0147274 A1 Oct. 10, 2002

(30) Foreign Application Priority Data

Jun. 1, 2000 (JP) ......................................... 2000-164668
Sep. 5, 2000 (JP) ......................................... 2000-135800

(51) Int. Cl.[7] ............................ C08L 53/02; C08L 57/00
(52) U.S. Cl. ........................ 525/338; 525/98; 525/92 A; 525/89
(58) Field of Search ............................ 525/328, 98, 338, 525/331.9, 332.9, 333.1, 92 A, 89

(56) References Cited

U.S. PATENT DOCUMENTS

| 4,994,508 A | 2/1991 | Shiraki et al. |
| 5,346,964 A | 9/1994 | Shibata et al. |

FOREIGN PATENT DOCUMENTS

| EP | 0299499 A | 1/1989 |
| EP | 09012804 | 1/1997 |
| EP | 1029876 A1 | 8/2000 |
| JP | 47-26369 A | 7/1972 |
| JP | 56-49958 B2 | 11/1981 |
| JP | 63-248817 A | 10/1988 |
| JP | 299499 A2 | 1/1989 |
| JP | 64-020284 A | 1/1989 |
| JP | 64-81877 A | 3/1989 |
| JP | 6-172593 A | 6/1994 |
| JP | 10-219040 A | 8/1998 |

*Primary Examiner*—James J. Seidleck
*Assistant Examiner*—Olga Asinovsky
(74) *Attorney, Agent, or Firm*—Birch, Stewart, Kolasch & Birch, LLP

(57) ABSTRACT

An object of the present invention is to provide a block copolymer having the excellent improving characteristics. Specifically, the block copolymer is a hydrogenated block copolymer capable of obtaining a molded product, as a polyolefin based resin composition, having excellent physical property balance between impact resistance, in particular, low temperature impact resistance and rigidity, and molding processability, and further, capable of providing, as a viscous adhesive composition, a composition having an excellent balance between adhesion characteristics such as adhesive power and retentivity, and having excellent melt viscosity stability under heating at a high temperature.

The block copolymer is a hydrogenation product of a block copolymer having at least one polymer block mainly comprising a vinyl aromatic hydrocarbon and at least one polymer block mainly comprising a conjugate diene compound, and having a vinyl bonding amount V (%) based on the conjugate diene compound of from not less than 37% to less than 70%, wherein (a) the total hydrogenation ratio H (%) of the unsaturated double bond based on the conjugate diene compound satisfies the following relational formulae:

$$V < H < 1.25 \times V + 10$$

$$50 \leq H < 80, \text{ and}$$

wherein (b) the hydrogenation ratio of the vinyl bond is 82% or more.

8 Claims, No Drawings

BLOCK COPOLYMER AND COMPOSITION CONTAINING THE COPOLYMER

This application is the national phase under 35 U.S.C. § 371 of PCT International Application No. PCT/JP01/03847 which has an International filing date of May 8, 2001, which designated the United States of America.

TECHNICAL FIELD

The present invention relates to a novel hydrogenated block copolymer which is a block copolymer of a vinyl aromatic hydrocarbon having a specific vinyl bonding amount and a conjugate diene compound, with the hydrogenation ratio controlled in a specific range. The present invention also relates to a block copolymer composition containing the block copolymer and a polyolefin based resin, or the block copolymer and an adhesion-imparting agent.

More specifically, the present invention relates to an impact resistant resin composition having excellent impact resistance, specifically low temperature impact resistance and molding processability; a soft resin composition having excellent softness, transparency, molding processability; and a flexible resin composition having excellent flexibility, elasticity and molding processability.

Moreover, the present invention relates to a viscous adhesive composition having well-balanced adhesion characteristics, such as adhesive power and retentivity, and excellent melt viscosity stability under heating at a high temperature.

BACKGROUND OF THE INVENTION

Since a polyolefin based resin, in general, has excellent chemical resistance and mechanical characteristics, it is used widely for the machine parts, automobile parts, domestic products, various containers, or the like. However, due to lack of impact strength, in particular, impact strength at a low temperature, the application purpose has sometimes been limited.

Then, in order to solve the problem, a large number of proposals have been provided concerning addition of a rubber component to a polyolefin. For example, JP-B-47-26369 (The term "JP-B" as used herein means an "examined Japanese patent publication") discloses a method for improving the impact resistance by adding a styrene-butadiene block copolymer and a thermoplastic elastomer to a polyolefin based resin. Moreover, JP-A-6-172593 (The term "JP-A" as used herein means an "unexamined published Japanese patent application") discloses a composition comprising a polyolefin based resin and a hydrogenated block copolymer. However, according to these methods, since an ordinary block copolymer is used, the balance between the impact resistance, in particular, low temperature impact resistance, and the molding processability such as thermal stability and flowability is not sufficient.

Furthermore, recently, development of a non-halogen based transparent polymer material is promoted as a countermeasure for the environmental issues. Particularly in the field of sheets and films, softness and transparency have been demanded to a polypropylene based resin, and attempts have been made for the improvement thereof. For example, JP-A-6-287365 discloses a composition containing a polypropylene and a hydrogenated diene based copolymer. However, a composition obtained by the method has poor transparency and insufficient processability.

In contrast, a hot melt type adhesive has been used widely in view of the environmental pollution and the work environment. As a base polymer for the hot melt type adhesive, a vinyl aromatic hydrocarbon-conjugate diene based block copolymer (SBS) is widely used. For example, JP-B-56-49958 discloses a viscous adhesive composition using such a block copolymer. However, the SBS generally has poor thermal stability, and an insufficient balance between the retentivity and the adhesive power, and thus the improvement thereof has been called for. As a method for improving the same, JP-A-64-81877 discloses an adhesive composition comprising a triblock copolymer and a diblock copolymer. Moreover, JP-A-63-248817 discloses an adhesive composition comprising a block copolymer obtained by coupling with a specific bifunctional coupling agent (a fatty series monoester, a specific dihalogen compound).

To the demand for the improvement, JP-B-4-68343 (U.S. Pat. No. 4,994,508) and JP-A-10-219040 disclose a composition comprising a block copolymer obtained by specific hydrogenation of a block copolymer of a vinyl aromatic hydrocarbon and a butadiene, and a polyolefin based resin. However, the hydrogenated block copolymer used in the present invention is not disclosed specifically in these documents, and further improvement has been required in terms of the balance between the low temperature impact resistance and the molding processability.

Furthermore, JP-B-5-69874 (U.S. Pat. No. 4,994,508) discloses a composition comprising a block copolymer obtained by specific hydrogenation of a block copolymer of a vinyl aromatic hydrocarbon and a conjugate diene based compound, and an adhesion-imparting agent. However, the hydrogenated block copolymer used in the present invention is not disclosed specifically therein, and further improvement has been required in terms of the melt viscosity stability under heating at a high temperature as well as the balance performance between the retentivity and the adhesion property.

An object of the present invention is to provide:

1) a polyolefin based resin composition having an excellent physical property balance among the impact resistance, particularly low temperature impact resistance, the rigidity, the molding processability (flowability) and the thermal resistant aging property (which composition is hereinafter referred to as an impact resistant resin composition), 2) a resin composition having excellent softness, transparency, and molding processability (which composition is hereinafter referred to as a soft resin composition), 3) a resin composition having excellent flexibility, elasticity, and molding processability (which composition is hereinafter referred to as a flexible resin composition), and 4) a viscous adhesive composition having excellent balance in adhesion characteristics such as adhesive power and retentivity, and having excellent melt viscosity stability under heating at a high temperature.

DISCLOSURE OF THE INVENTION

In order to achieve the above-mentioned objects, the present inventors made extensive studies. As a result, it was found that a hydrogenated block copolymer obtained by controlling, to a specific range, the hydrogenation ratio of a block copolymer of a vinyl aromatic hydrocarbon having a specific vinyl bonding amount and a conjugate diene compound provides excellent effects for improvement of a polyolefin based resin. Then, it was also found that the above-mentioned objects can be achieved effectively by a composition comprising the hydrogenated block copolymer and a polyolefin based resin, or a composition comprising the block copolymer and an adhesion-imparting agent, thereby completing the present invention. That is, the present invention provides:

1. A hydrogenated block copolymer, which is (1) a hydrogenation product of a block copolymer having at least one polymer block mainly comprising a vinyl aromatic hydrocarbon and at least one polymer block mainly comprising a conjugate diene compound, and having a vinyl bonding amount V (%) based on the conjugate diene compound of from not less than 37% to less than 70%, wherein (a) the total hydrogenation ratio H (%) of the unsaturated double bond based on the conjugate diene compound satisfies the following relational formulae:

$$V<H<1.25\times V+10$$

$$50\leq H<80, \text{ and}$$

wherein (b) the hydrogenation ratio of the vinyl bond is 82% or more;

2. A block copolymer composition, comprising:
(1) the hydrogenated block copolymer according to item 1 above, and
(2) a polyolefin based resin;

3. The block copolymer composition according to item 2 above, comprising 1 to 50 parts by weight of component (1) and 99 to 50 parts by weight of component (2) with respect to 100 parts by weight of the total weight of components (1) and (2), wherein component (1) further satisfies the following conditions:
(c) the content of the vinyl aromatic hydrocarbon is 5 to 50% by weight, and
(d) the melt flow rate is 0.5 to 100 g/10 minutes;

4. The block copolymer composition according to item 2 above, comprising 1 to 95 parts by weight of component (1) and 99 to 5 parts by weight of component (2) with respect to 100 parts by weight of the total weight of components (1) and (2), wherein component (1) further satisfies the following conditions:
(c) the content of the vinyl aromatic hydrocarbon is 5 to 35% by weight, and
(d) the number average molecular weight is from more than 30,000 to less than 330,000;

5. The block copolymer composition according to item 2 above, comprising 20 to 95 parts by weight of component (1) and 80 to 5 parts by weight of component (2), each with respect to 100 parts by weight of the total weight of components (1) and (2), and 5 to 300 parts by weight of (3) a non-aromatic rubber softener and not more than 500 parts by weight of (4) an inorganic filler, each with respect to 100 parts by weight of component (1), wherein component (1) further satisfies the following conditions:
(c) the content of the vinyl aromatic hydrocarbon is 5 to 50% by weight, and
(d) the number average molecular weight is 50,000 to 1,000,000;

6. A block copolymer composition, comprising:
(1) 100 parts by weight of a hydrogenated block copolymer which is a hydrogenation product of a block copolymer having at least one polymer block mainly comprising a vinyl aromatic hydrocarbon and at least one polymer block mainly comprising a conjugate diene compound, and having a vinyl bonding amount V (%) based on the conjugate diene compound of from not less than 30% to less than 70%, wherein (a) the total hydrogenation ratio H (%) of the unsaturated double bond based on the conjugate diene compound satisfies the following relational formulae:

$$V<H<1.25\times V+10$$

$$55\leq H<80, \text{ and}$$

wherein (b) the hydrogenation ratio of the vinyl bond is 82% or more, and (2) 20 to 400 parts by weight (with respect to 100 parts by weight of component (1)) of an adhesion-imparting agent;

7. The block copolymer composition according to item 6 above, wherein component (1) further satisfies the following conditions:
(c) the content of the vinyl aromatic hydrocarbon is 5 to 60% by weight, and
(d) the peak molecular weight is 50,000 to 300,000; and 8. A block copolymer composition, comprising:
(1) 100 parts by weight of a hydrogenated block copolymer which is a hydrogenation product of a block copolymer having at least one polymer block mainly comprising a vinyl aromatic hydrocarbon and at least one polymer block mainly comprising a conjugate diene compound, and having a vinyl bonding amount V (%) based on the conjugate diene compound of from not less than 30% to less than 70%, wherein (a) the total hydrogenation ratio H (%) of the unsaturated double bond based on the conjugate diene compound satisfies the following relational formulae:

$$V<H>2\times V+10$$

$$30\leq H<80, \text{ and}$$

wherein (b) the hydrogenation ratio of the vinyl bond is 82% or more, and (2) 20 to 400 parts by weight (with respect to 100 parts by weight of component (1)) of an adhesion-imparting agent, wherein component (1) comprises:
(1-A) 20 to 90% by weight of a hydrogenated block copolymer which is a hydrogenation product of a block copolymer having one polymer block mainly comprising a vinyl aromatic hydrocarbon and one polymer block mainly comprising a conjugate diene compound, and having a vinyl bonding amount V (%) based on the conjugate diene compound of not less than 30% to less than 70%, wherein (a) the total hydrogenation ratio H (%) of the unsaturated double bond based on the conjugate diene compound satisfies the following relational formulae:

$$V<H<2\times V+10$$

$$30\leq H<80,$$

wherein (b) the hydrogenation ratio of the vinyl bond is 82% or more, and wherein (c) the content of the vinyl aromatic hydrocarbon is 5 to 60% by weight; and (1-B) 80 to 10% by weight of a hydrogenated block copolymer which is a hydrogenation product of a block copolymer having at least two polymer blocks mainly comprising a vinyl aromatic hydrocarbon and at least one polymer block mainly comprising a conjugate diene compound, and having a vinyl bonding amount V (%) based on the conjugate diene compound of from not less than 30% to less than 70%, wherein (a) the total hydrogenation ratio H (%) of the unsaturated double bond based on the conjugate diene compound satisfies the following relational formulae:

$$V<H<2\times V+10$$

$$30\leq H<80,$$

wherein (b) the hydrogenation ratio of the vinyl bond is 82% or more, and wherein (c) the content of the vinyl aromatic hydrocarbon is 5 to 60% by weight, wherein the average molecular weight of component (1-A) and component (1-B) is 50,000 to 300,000.

BEST MODE FOR CARRYING OUT THE INVENTION

Hereinafter, the present invention will be explained in detail.

The hydrogenated block copolymer which is component (1) used in the present invention is a hydrogenation product of a block copolymer having at least one polymer block mainly comprising a vinyl aromatic hydrocarbon and at least one polymer block mainly comprising a conjugate diene compound. As the vinyl aromatic monomer unit, one or two or more can be selected from styrene, alkyl styrenes such as α-methyl styrene, p-methyl styrene and p-tertial butyl styrene, paramethoxy styrene, vinyl naphthalene, or the like. In particular, styrene is preferred. The conjugate diene compound is a diolefin having a pair of conjugate double bonds. Examples thereof include 1,3-butadiene, 2-methyl-1,3-butadiene (isoprene), 2,3-dimethyl-1,3-butadiene, 1,3-pentadiene, and 1,3-hexadiene. As those used particularly generally, 1,3-butadiene, isoprene, or the like, can be presented. These compounds can be used singly or in a combination of two or more thereof.

The method for producing the block copolymer before hydrogenation includes, for example, the methods disclosed in JP-B-36-19286, JP-B-43-17979, JP-B-46-32415, JP-B-49-36957, JP-B-48-2423, JP-B-48-4106, JP-B-56-28925, JP-B-51-49567, JP-A-59-166518, JP-A-60-186577. According to these methods, the block copolymer can be obtained as a block copolymer represented by the general formulae:

(A-B)$_n$, A-(B-A)$_n$, B-(A-B)$_n$ (In the above formulae, A is a polymer block mainly comprising a vinyl aromatic hydrocarbon, and B is a polymer mainly comprising a conjugate diene compound. The boundary of the block A and the block B is not necessarily distinguished clearly. Further, n is an integer of 1 or more, generally, 1 to 5.), or as a block copolymer represented by the general formulae:

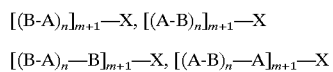

[(B-A)$_n$]$_{m+1}$—X, [(A-B)$_n$]$_{m+1}$—X

[(B-A)$_n$—B]$_{m+1}$—X, [(A-B)$_n$—A]$_{m+1}$—X (In the above-mentioned formulae, A, B, n are the same as mentioned above, and X is a residual group of a coupling agent of a polyvinyl compound such as silicon tetrachloride, tin tetrachloride, epoxidated soy oil, a bifunctional to hexafunctional epoxy group-containing compound, a polyhalide hydrocarbon, a carboxylic ester and a divinyl benzene, or is a residual group of an initiator such as a polyfunctional organic lithium compound. m is an integer of 1 or more, generally, 1 to 10. The polymer structure of the branched chain part bonded to X may be the same or different.). In the above-mentioned description, the polymer block mainly comprising a vinyl aromatic hydrocarbon denotes a copolymer block of a vinyl aromatic hydrocarbon and a conjugate diene compound, containing 50% by weight or more, preferably 70% by weight or more, of the vinyl aromatic hydrocarbon, and/or a vinyl aromatic hydrocarbon homopolymer block. The polymer block mainly comprising a conjugate diene compound denotes a copolymer block of a conjugate diene compound and a vinyl aromatic hydrocarbon, containing 50% by weight or more, preferably 70% by weight or more, of the conjugate diene compound, and/or a conjugate diene compound homopolymer block. The vinyl aromatic hydrocarbon may be distributed homogeneously or in a tapered form in the copolymer block.

Further, in the copolymer part, each plurality of a part with the vinyl aromatic hydrocarbon distributed homogeneously and/or a part with the same distributed in a tapered form may coexist. The hydrogenated block copolymer used in the present invention may be any mixture of the hydrogenation product of the block copolymer represented by the above-mentioned formulae so long as the conditions specified in the present invention are satisfied.

In the present invention, the vinyl bonding amount V (%) based on the conjugate diene compound in the block copolymer before hydrogenation is 37% or more and less than 70%, preferably 40% or more and less than 65%, and further preferably 47% or more and less than 63%. Here, the term vinyl bonding amount denotes the ratio of conjugate diene compounds incorporated in the manner of the 1,2-bond or the 3,4-bond among the conjugate diene compounds incorporated in the block copolymer in the bonding manner of the 1,2-bond, the 3,4-bond or the 1,4-bond. In the case where the vinyl bonding amount is outside the range specified in the present invention, a product of the targeted performance cannot be obtained. For example, in the above-mentioned impact resistant resin composition, with a less than 37% by weight vinyl bonding amount, the affinity of the hydrogenated block copolymer and the polyolefin based resin is insufficient so that the important low temperature impact resistance is deteriorated as well as the processability is lowered. In contrast, with a 70% by weight or more value, the affinity with the polyolefin based resin is excessive so that a resin composition with poor low temperature impact resistance and rigidity is obtained. Moreover, in the case of the soft resin composition, with a less than 37% by weight vinyl bonding amount, the affinity of the hydrogenated block copolymer and the polyolefin based resin is insufficient so that the transparency and the softness are deteriorated as well as the processability is lowered. In contrast, with a 70% by weight or more value, a resin composition with a poor transparency is obtained.

Furthermore, in the case of the viscous adhesive composition, the vinyl bonding amount V (%) based on the conjugate diene compound in the block copolymer before hydrogenation is 30% or more and less than 70%, preferably 35% or more and less than 68%, and further preferably 40% or more and less than 65%. With a value outside the range, the adhesion property and the compatibility are deteriorated due to insufficient affinity with the adhesion-imparting agent.

The vinyl bonding amount can be adjusted at the time of producing the block copolymer by using an ether compound such as dimethyl ether, diethyl ether, diphenyl ether, tetrahydrofuran, diethylene glycol dimethyl ether and diethylene glycol dibutyl ether, a tertiary amine such as trimethyl amine, triethyl amine, N,N,N',N'-tetramethyl ethylene diamine and diazobicyclo[2,2,2]octane, or the like as a vinyl amount adjusting agent.

The hydrogenated block copolymer used in the present invention can be obtained by hydrogenation (hydrogenation reaction) of the above-mentioned block copolymer. As a catalyst for use in the hydrogenation reaction, (1) a supporting type heterogeneous catalyst having a metal such as Ni, Pt, Pd, and Ru supported by carbon, silica, alumina, diatomaceous earth, or the like, (2) a so-called Ziegler type catalyst using a transitional metal salt, such as an organic acid salt or acetyl acetone salt of Ni, Co, Fe and Cr, and a reducing agent, such as an organoaluminum, and (3) a homogeneous catalyst of a so-called organic metal complex or the like, such as an organic metal compound of Ti, Ru, Rh, Zr, or the like, are known. The specific method for the hydrogenation reaction includes the methods disclosed in JP-B-42-8704, JP-B-43-6636, JP-B-63-4841, JP-B-1-37970, JP-B-1-53851, and JP-B-2-9041. A hydrogenation product can be obtained by hydrogenation in a hydrocarbon solvent in the presence of a hydrogenation catalyst. At that time, the hydrogenation ratio of the block copolymer can be controlled by adjusting the reaction temperature, the reaction time, the hydrogen supply amount, the catalyst amount, or the like.

In the hydrogenated block copolymer used in the present invention, the total hydrogenation ratio H (%) of the unsaturated double bond based on the conjugate diene compound should satisfy the following relational formulae:

$$V<H<1.25\times V+10$$

$$50\leq H<80,$$

preferably, $$V<H<1.25\times V+10$$

$$55\leq H<78,$$

further preferably, $$V+5<H<1.25\times V+10$$

$$55\leq H<78.$$

In the composition with a polyolefin based resin, in the case where the total hydrogenation ratio H is less than the vinyl bonding amount V before hydrogenation, the thermal resistant aging property is deteriorated. Furthermore, in the impact resistant resin composition, the balance between the low temperature impact resistance and the rigidity is deteriorated, and in the case of the soft resin composition, the transparency is deteriorated. In contrast, in the case where it is 1.25×V+10 or more, the processability of the resin composition is lowered. Moreover, even in the case where the total hydrogenation ratio H satisfies V+5<H<1.25V+10, if H is 80% or more, the processability is lowered compared with the resin composition within the range of the present invention.

Moreover, in the hydrogenated block copolymer used for a viscous adhesive composition in the present invention, the total hydrogenation ratio H (%) of the unsaturated double bond based on the conjugate diene compound should satisfy the following relational formulae:

$$V<H<2\times V+10$$

$$30\leq H<80,$$

preferably, $$V<H<2\times V+10$$

$$35\leq H<78,$$

further preferably, $$V<H<2\times V+5$$

$$35\leq H<78.$$

In the viscous adhesive composition, in the case where the total hydrogenation ratio H is the same as or less than the vinyl bonding amount V before hydrogenation, or it is 2×V+10 or more, the balance between the retentivity and the adhesion property is poor, and thus it is not preferred. Moreover, even in the case where the total hydrogenation ratio H satisfies V<H<2×V+10, if it is 80% or more, the adhesion property is lowered compared with the viscous adhesive composition within the range of the present invention.

According to the present invention, in the hydrogenated block copolymer, the hydrogenation ratio of the vinyl bond in the conjugate diene before hydrogenation should be 82% or more, preferably 85% or more, further preferably 90% or more. In the case where the hydrogenation ratio of the vinyl bond is less than 82%, the thermal stability and the melt viscosity stability under heating at a high temperature are poor, and thus it is not preferred. Here, the hydrogenation ratio of the vinyl bond denotes the ratio of the hydrogenated vinyl bond among the vinyl bonds in the conjugate diene before hydrogenation incorporated in the block copolymer.

Although the hydrogenation ratio of the aromatic double bond based on the vinyl aromatic hydrocarbon in the block copolymer is not particularly limited, it is preferred that the hydrogenation ratio is 50% or less, preferably 30% or less, further preferably 20% or less. The hydrogenation ratio can be measured by an infrared spectrophotometer, a nuclear magnetic resonance device (NMR), or the like.

The content of the vinyl aromatic hydrocarbon in the hydrogenated block copolymer used in the present invention is preferably 5 to 50% by weight, further preferably 8 to 45% by weight, most preferably 10 to 40% by weight. In the case where the vinyl aromatic hydrocarbon content of the hydrogenated block copolymer is outside the range, the characteristics targeted by the present invention cannot be obtained.

In the composition with a polyolefin based resin, for example, in the case where it is used for the impact resistant resin composition, if the content of the vinyl aromatic hydrocarbon of the hydrogenated block copolymer is less than 5% by weight, the rigidity is poor, and if it is more than 50% by weight, the low temperature impact resistance may be deteriorated. Moreover, in the present invention, the vinyl aromatic hydrocarbon content of the hydrogenated block copolymer preferred for the soft resin composition is recommended to be 5 to 35% by weight, preferably more than 8% by weight and less than 30% by weight, further preferably more than 10% by weight and less than 25% by weight. In the case where the vinyl aromatic hydrocarbon content is 5% by weight or less, the blocking resistance characteristic of a film produced by molding the soft resin composition is deteriorated, and in the case where it is 35% by weight or more, the softness and transparency as the soft resin composition is poor.

Furthermore, in the case of the viscous adhesive composition, if the vinyl aromatic hydrocarbon content of the hydrogenated block copolymer is less than 5% by weight, the retentivity is poor, and if it is more than 60% by weight, the adhesion property may be poor.

In the composition with a polyolefin based resin, for example, in the case where it is used for the impact resistant resin composition, the melt flow rate of the hydrogenated block copolymer (in accordance with JIS K6758: 230° C., 2.16 kg load) is preferably 0.5 g to 100 g/10 minutes, further preferably 1 to 80 g/10 minutes, most preferably 2 to 50 g/10 minutes. In the case where the melt flow rate is less than 0.5 g/10 minutes, the molding property of the composition to be obtained is poor, and in the case where it is more than 100 g/10 minutes, the low temperature impact resistance may be lowered. A preferred number average molecular weight of the hydrogenated block copolymer is recommended to be more than 30,000 and less than 330,000, preferably more than 50,000 and less than 250,000, further preferably more than 70,000 and less than 200,000. In this range, the molding property and the softness of the soft resin composition can be well-balanced.

Furthermore, in the present invention, in the hydrogenated block copolymer preferred for the flexible resin composition, the number average molecular weight is recommended to be 50,000 to 1,000,000, preferably 70,000 to 500,000, further preferably 90,000 or more and less than 330,000. In the case where the number average molecular weight is less than 50,000, the strength of the flexible resin composition is lowered, and in the case where it is more than 1,000,000, the molding property is deteriorated.

In contrast, in the present invention, the molecular weight of the hydrogenated block copolymer preferred for the viscous adhesive composition is 50,000 to 300,000, preferably 60,000 to 250,000, further preferably 70,000 to 200,000 in terms of the peak molecular weight on the standard polystyrene basis by the GPC measurement. In the viscous adhesive composition, if the peak molecular weight is less than 50,000, the retentivity of the viscous adhesive composition is poor, and if it is more than 300,000, the melt viscosity becomes higher so as to deteriorate the coating performance, or the like of the viscous adhesive composition, and thus it is not preferred.

In the viscous adhesive composition of the present invention, in order to obtain a viscous adhesive composition with an excellent balance of the retentivity, the adhesion property, and the melt viscosity, it is recommended to use, as the hydrogenated block copolymer of component (1), a hydrogenated block copolymer comprising:

(1-A) 20 to 90% by weight, preferably 25 to 80% by weight of a hydrogenated block copolymer having one polymer block mainly comprising a vinyl aromatic hydrocarbon, and one polymer block mainly comprising a conjugate diene compound, with the vinyl bonding amount V, the total hydrogenation ratio H, the hydrogenation ratio of the vinyl bond and the content of the vinyl aromatic hydrocarbon satisfying the above-mentioned conditions, and (1-B) 80 to 10% by weight, preferably 75 to 20% by weight of a hydrogenated block copolymer having at least two polymer blocks mainly comprising a vinyl aromatic hydrocarbon, and at least one polymer block mainly comprising a conjugate diene compound, with the vinyl bonding amount V, the total hydrogenation ratio, the hydrogenation ratio of the vinyl bond and the content of the vinyl aromatic hydrocarbon satisfying the above-mentioned conditions.

As for the molecular weight of these hydrogenated block copolymers (peak molecular weight on the standard polystyrene basis by a GPC measurement), it is particularly preferred that component (1-A) has a 30,000 to 150,000, preferably 40,000 to 140,000, further preferably 50,000 to 130,000 value, and component (1-B) has a 100,000 to 300,000, preferably 120,000 to 280,000, further preferably 140,000 to 260,000, in respect of the balance of the retentivity and the adhesion property, and the melt viscosity for the viscous adhesive composition. The average molecular weights of component (1-A) and component (1-B) need to be set at a molecular weight in the range explained for the molecular weight of the hydrogenated block copolymer of the above-mentioned component (1).

In the present invention, the hydrogenated block copolymer comprising component (1-A) and component (1-B) can be obtained by, for example, polymerizing a styrene in an inert hydrocarbon solvent with an organic lithium component used as the polymerization initiator, then polymerizing a butadiene therewith, and further optionally polymerizing separately two block copolymers, having different molecular weight, of the styrene butadiene block copolymer obtained by repeating these operations, and mixing. At the time, the molecular weight can be adjusted by controlling the organic lithium compound amount. As to the method for mixing the composition (A), it can be obtained by blending, at a predetermined composition, polymerization solutions of each component with the active species deactivated by adding water, alcohol, an acid, or the like after the polymerization reaction, separating the polymerization solution by, for example, steam stripping, and drying. Moreover, it can be obtained also by blending polymers obtained by independently separating and drying polymerization solvents by a roll, or the like.

Further, the hydrogenated block copolymer containing component (1-A) and component (1-B) can be obtained also by another method different from the above-mentioned. That is, component (1-B) is produced as a copolymerization product obtained by adding a predetermined amount of an adequate coupling agent with respect to the organic lithium compound in the polymerization vessel after polymerizing component (1-A) by the same method as mentioned above, to thereby obtain a desired composition in the same reaction vessel. By using this method, the peak molecular weight of component (1-B) is an integral multiple of the peak molecular weight of component (1-A), and the monoalkenyl aromatic compound content in component (1-A) and component (1-B) is the same so that the structure is limited. However, it is industrially advantageous compared with the above-mentioned method.

As the coupling agent, a bifunctional coupling agent can be used preferably. Examples thereof include silicon halide compounds such as dichlordimethyl silane and phenyl methyl dichlorosilane, alkoxy silicon compounds such as dimethyl dimethoxy silane, tin compounds such as dichlordimethyl tin, ester compounds such as methyl benzoate, vinyl allenes such as divinyl benzene, and bifunctional epoxy compounds.

In the block copolymer composition of the present invention, as the hydrogenated block copolymer of component (1), two or more kinds of different vinyl contents V before hydrogenation, different total hydrogenation ratios H, different melt flows, different vinyl aromatic hydrocarbon contents, and different polymer structures can be used. By using two or more kinds of hydrogenated block copolymers satisfying the conditions specified in the present invention, the balance of the physical properties can further be improved. Moreover, in the hydrogenated block copolymer used in the present invention, a modified polymer with a polar group containing a functional group selected from nitrogen, oxygen, silicon, phosphorus, sulfur and tin, bonded with a polymer, or one containing a functional group by modifying by addition reaction with an unsaturated carboxylic acid or a derivative thereof can be used for a part or the entirety thereof.

By eliminating the solvent from the solution of the hydrogenated block copolymer obtained as mentioned above, by an ordinary method, a hydrogenated block copolymer of the present invention can be obtained. As needed, it can be used in a step of eliminating metal salts. Moreover, as needed, a reaction inhibitor, an antioxidant, a neutralizing agent, a surfactant, or the like, can be used.

The polyolefin based resin for component (2) used in the present invention is not particularly limited as long as it is a resin obtained by polymerizing one or two or more polymers selected from an ethylene, an α-olefin having 3 to 12 carbon atoms, such as propylene, 1-butene, isobutylene, 4-methyl-1-pentene and 1-octene. For example, a polyethylene, a polypropylene, an ethylene-propylene copolymer, a polybutene, an ethylene-butene copolymer, an ethylene-octene copolymer, or the like, can be presented. The copolymer can be either a random copolymer or a block copolymer. Component (2) may be a mixture thereof. Moreover, an olefin based thermoplastic elastomer, such as a copolymer rubber of two or three or more kinds of α-olefins, and a copolymer of an α-olefin and another monomer can be contained as well. As the copolymer rubbers, an ethylene-propylene copolymer rubber (EPR), an ethylene-butene copolymer rubber (EBR), an ethylene-octene copolymer rubber, an ethylene-propylene-diene copolymer rubber (EPDM), or the like, can be presented. Among these polyolefin based resins, a homo or block polypropylene is preferred. In particular, by using a syndiotactic polypropylene homopolymer or a propylene-ethylene block block resin having a 155° C. or higher crystal fusing peak temperature by the DSC, the thermal resistance of the composition to be obtained can be high.

Moreover, the melt flow rate of the polyolefin based resin in the present invention is preferably in a range of 0.1 to 150 g/10 minutes (in accordance with JIS K6758: 230° C., 2.16 kg load). As the polymerizing method for the polyolefin based resin, any of the conventionally known methods can be used. Examples thereof include the transition polymerization, the radical polymerization, the ion polymerization.

In the composition of the hydrogenated block copolymer and the polyolefin based resin of the present invention, the ratio of the (1) hydrogenated block copolymer is 1 to 95 parts by weight, preferably 3 to 90 parts by weight, further preferably 5 to 85 parts by weight, and the ratio of the (2) polyolefin based resin is 99 to 5 parts by weight, preferably 97 to 10 parts by weight, further preferably 95 to 15 parts by weight. In the case where the ratio of the polyolefin based resin and the hydrogenated block copolymer is outside the range, the performance targeted by the present invention cannot be obtained.

In the present invention, a preferred composition ratio for the impact resistant resin composition is recommended to be 99 to 50 parts by weight, preferably 97 to 60 parts by weight, further preferably 95 to 65 parts by weight of the polyolefin based resin (1), and 1 to 50 parts by weight, preferably 3 to 40 parts by weight, further preferably 5 to 35 parts by weight of the hydrogenated block copolymer (2). In the case where the hydrogenated block copolymer ratio is less than 1 part by weight, the impact strength is low, and in the case it is more than 50 parts by weight, the rigidity is deteriorated.

Moreover, in the present invention, a preferred composition ratio for the soft resin composition is recommended to be 99 to 5 parts by weight, preferably 95 to 10 parts by weight, further preferably 90 to 15 parts by weight of the polyolefin based resin (1), and 1 to 95 parts by weight, preferably 5 to 90 parts by weight, further preferably 10 to 85 parts by weight of the hydrogenated block copolymer (2). In the case the ratio of the hydrogenated block copolymer is less than 1 part by weight, the softness of the soft resin composition is poor, and in the case where it is more than 95 parts by weight, the blocking resistance characteristic of a film produced by molding the soft resin composition is deteriorated.

Furthermore, in the present invention, a preferred composition ratio for the flexible resin composition is recommended to be 20 to 95 parts by weight, preferably 40 to 90 parts by weight, further preferably 50 to 85 parts by weight of the hydrogenated block copolymer (1), and 80 to 5 parts by weight, preferably 60 to 10 parts by weight, further preferably 50 to 15 parts by weight of the polyolefin based resin (2). In the case the ratio of the hydrogenated block copolymer is less than 20 parts by weight, the flexibility of the flexible resin composition is poor, and in the case where it is more than 95 parts by weight, the hardness and the rigidity are lowered.

In the present invention, in obtaining the flexible resin composition, it is recommended to provide 5 to 300 parts by weight, preferably 10 to 200 parts by weight, further preferably 15 to 150 parts by weight of a non-aromatic rubber softener with respect to 100 parts by weight of the above-mentioned hydrogenated block copolymer (1). In the case where the content of the non-aromatic rubber softener is less than 5 parts by weight, the flexibility of the flexible resin composition is poor, and in the case it is more than 300 parts by weight, the mechanical strength is lowered. As the non-aromatic rubber softener, for example, ore oil based softeners generally referred to as paraffin based or naphthene based oils can be presented. In particular, a paraffin based oil is preferred in terms of the impact resilience, and the thermal resistance stability.

In the resin composition of the present invention, an optional additive may be added as needed. The kind of the additive is not particularly limited as long as it is one commonly used for a resin composition. For example, inorganic fillers such as silica, calcium carbonate, magnesium carbonate, magnesium peroxide, calcium sulfate, barium sulfate, talc, mica, silicic acid (white carbon) and titanium oxide, pigments such as carbon black and iron oxide, lubricating agents such as stearic acid, behenic acid, zinc stearate, calcium stearate, magnesium stearate and ethylene bisstearoamide, mold releasing agents, plasticizers such as an organic polysiloxane and a mineral oil, antioxidants such as a hindered phenol based antioxidant and a phosphorus based thermal stabilizer, hindered amine based light stabilizers, benzotriazol based ultraviolet ray absorbers, flame retarders, antistatic agents, reinforcing agents such as organic fiber, glass fiber, carbon fiber and metal whisker, coloring agents, other additives, and a mixture thereof, can be presented.

In the impact resistant resin composition of the present invention, the amount of the inorganic filler is recommended to be 50 parts by weight or less, preferably 5 to 40 parts by weight with respect to 100 parts by weight of the total amount of the polyolefin based resin and the hydrogenated block copolymer in view of the balance of the impact resistance and the rigidity. Moreover, the amount of the inorganic filler in the flexible resin composition is recommended to be 500 parts by weight or less, preferably 10 to 300 parts by weight, further preferably 30 to 200 parts by weight with respect to 100 parts by weight of the hydrogenated block copolymer in respect of the flexibility, the mechanical strength and the molding processability.

Next, the kind of the adhesion-imparting agent as component (2) used in the present invention is not particularly limited, and known adhesion providing resins such as a rosin based terpene based resin, a hydrogenated rosin based terpene based resin, a courmarone based resin, a phenol based resin, a terpene-phenol based resin, an aromatic hydrocarbon resin, and an aliphatic hydrocarbon resin, can be presented. These adhesion-imparting agents can be used as a mixture of two or more thereof. As a specific example of the adhesion-imparting agent, those disclosed in "Rubber-Plastic Composition Chemicals" (edited by Rubber Digest Corp.) can be used. As to the amount of the adhesion-imparting agent, it can be used in a range of 20 to 400 parts by weight, preferably in a range of 50 to 350 parts by weight with respect to 100 parts by weight of component (1). In the case where the amount is less than 20 parts by weight, the adhesion property can hardly be provided to the viscous adhesive composition. On the other hand, in the case where it is more than 400 parts by weight, the retentivity of the viscous adhesive composition is lowered. In either case, the viscous adhesion characteristic tends to be deteriorated.

Moreover, in the present invention, for the viscous adhesive composition, known naphthene based, or paraffin based process oils, and an oil mixture thereof can be used as the softener. By adding a softener, since the viscosity of the viscous adhesive composition is lowered, the processability is improved as well as the adhesion property is improved. As to the amount of the softener, it is used in a range of 0 to 200 parts by weight with respect to 100 parts by weight of component (1). In the case where it exceeds 200 parts by weight, the retentivity of the adhesive composition tends to be remarkably deteriorated.

Preferred stabilizers used for the resin composition or the viscous adhesive composition of the present invention include, for example, hindered phenol based antioxidants such as 2,6-di-t-butyl-4-methyl phenol, n-octadecyl-3-(4'-hydroxy-3',5'-di-t-butyl phenyl)propionate, 2,2'-methylene bis(4-methyl-6-t-butyl phenol), 2,2'-methylene bis(4-ethyl-6-t-butyl phenol), 2,4-bis[(octyl thio)methyl]-0-cresol, 2-t-butyl-6-(3-t-butyl-2-hydroxy-5-methyl benzyl)-4-methyl phenyl acrylate, 2,4-di-t-amyl-6-[1-(3,5-di-t-amyl-2-hydroxy phenyl)ethyl]phenyl acrylate and 2-[1-(2-hydroxy-3,5-di-tert-pentyl phenyl)]acrylate; sulfur based antioxidants such as dilauryl thiodipropionate and lauryl stearyl thiodipropionate pentaerythritol-tetraxo (β-lauryl thiopropionate); and phosphorus based antioxidants such as tris(nonyl phenyl)phosphite, and tris(2,4-di-t-butyl phenyl) phosphite. Moreover, examples of the light stabilizer include, for example, benzotriazol based ultraviolet ray absorbers such as 2-(2'-hydroxy-5'-methyl phenyl) benzotriazol, 2-(2'-hydroxy-3',5'-t-butyl phenyl) benzotriazol and 2-(2'-hydroxy-3',5'-di-t-butyl phenyl)-5-chlorobenzotriazol, benzophenone based ultraviolet ray absorbers such as 2-hydroxy-4-methoxy benzophenone, and hindered amine based light stabilizers.

To the resin composition or the viscous adhesive composition of the present invention, as needed, pigments such as red iron oxide and titanium dioxide; waxes such as paraffin wax, microcrystalline wax and low molecular weight wax; amorphous polyolefin or low molecular weight vinyl aromatic thermoplastic resins; natural rubbers; and synthetic rubbers such as polyisoprene rubber, polybutadiene rubber, styrene-butadiene rubber, ethylene-propylene rubber, chloroprene rubber, acrylic rubber, isoprene-isobutylene rubber, polypentenamer rubber and styrene-isoprene based block copolymer other than those of the present invention, may be added.

The production method for the resin composition of the present invention is not particularly limited, and known methods can be used. For example, a melt-kneading method using an ordinary kneader, such as a banbary mixer, a single axis screw extruder, a two axes screw extruder, a co-kneader, and a multiple axes screw extruder, a method of dissolving and dispersing and mixing the components, and heating for eliminating the solvent, or the like, can be used. In the present invention, the melt-mixing method with the extruder is preferred in terms of the productivity and the kneading convenience.

Moreover, the production method for the viscous adhesive composition of the present invention is not particularly limited, and known methods can be used. For example, it can be prepared by a method of homogeneously mixing while heating, using a known mixer or kneader, or the like.

EXAMPLES

The present invention will be illustrated in greater detail with reference to the following Examples, but the invention should not be construed as being limited thereto.

1. Polyolefin Based Resin Composition
(I) Components to be Used, and Production Thereof
(1) Block Copolymer
Analysis of Block Copolymer The block copolymer was analyzed according to the following method.
1) Styrene Content:
Measured by an infrared spectrophotometer (produced by Nihon Bunko Corp., FT/IR-410).
2) Vinyl Amount:
Measured by an infrared spectrophotometer (produced by Nihon Bunko Corp., FT/IR-410), and calculated by the Hampton Method.
3) Molecular Weight:

The GPC comprises a device produced by Waters, and three columns as a combination of two sets of ZORBAX PSM1000-S, and PSM60-S produced by Dupont Corp. As the solvent, a tetrahydrofuran was used, and the measurement condition included a 35° C. temperature. The molecular weight is a number average molecular weight of the chromatogram peak molecular weight, found out using a calibration curve (produced using the peak molecular weight of a standard polystyrene) calculated based on measurement of a commercially available standard polystyrene. In the case a plurality of peaks exist in the chromatogram, the molecular weight denotes an average molecular weight calculated from the peak molecular weights and the peak composition ratios (calculated from the area ratio of each peak in the chromatogram).
4) Hydrogenation Ratio H and the Hydrogenation Ratio of the Vinyl Bond:

The hydrogenation ratio H and the hydrogenation ratio of the vinyl bond were measured using a nuclear magnetic resonance device (produced by BRUKER Corp., DPX-400).
Preparation of Block Copolymer The hydrogenated block copolymer used for the polyolefin based resin composition was produced by the following method.

1) Into a 100 L capacity autoclave having an agitator and a jacket after washing, drying, and nitrogen displacement, a cyclohexane solution containing 10 parts by weight of a preliminarily purified styrene was placed. Then, n-butyl lithium and tetramethyl ethylene diamine were added. After polymerizing at 70° C. for 1 hour, polymerization was carried out for further 1 hour after adding a cyclohexane solution containing 80 parts by weight of a preliminarily purified butadiene, and still further 1 hour after adding a cyclohexane solution containing 10 parts by weight of a styrene.

A part of the obtained block copolymer solution was sampled. 0.3 part by weight of an octadecyl-3-(3,5-di-t-butyl-4-hydroxy phenyl)propionate was added to 100 parts by weight of the block copolymer, and thereafter the solvent was eliminated by heating (the obtained copolymer is referred to as Polymer 1). Polymer 1 has a 20% by weight styrene content, and a 50% by weight 1,2 vinyl bonding amount of the polybutadiene part.

Next, using the remaining block copolymer solution, hydrogenation was carried out at a 70° C. temperature with a di-p-trisbis(1-cyclopenta dienyl)titanium and n-butyl lithium as the hydrogenation catalyst. A part of the polymer solution was sampled so as to obtain Polymer 2. Polymer 2 has a 40% total hydrogenation ratio H of the unsaturated double bond based on the butadiene (hereinafter referred to as the hydrogenation ratio H), and a 90 g/10 minutes melt flow. Moreover, the hydrogenation ratio H was controlled by measuring the supplied hydrogen gas amount by a flow meter, and stopping the gas supply at the time the targeted hydrogenation ratio was achieved. Hydrogenation was carried out again for the remaining polymer solution so as to obtain Polymer 3 and Polymer 4 copolymer solutions. Polymer 3 has a 65% hydrogenation ratio H, and a 40 g/10 minutes melt flow. Moreover, Polymer 4 has a 97% hydrogenation ratio H, and a 12 g/10 minutes melt flow.

In the same manner as in the case of Polymer 1, the solvent of each copolymer solution was eliminated by heating after adding a stabilizer so as to produce Polymers 2, 3 and 4. The polymer structure of each sample is shown in Table 1.

Moreover, the hydrogenation ratio of the vinyl bond of each polymer is shown in Table 1.

2) In the same manner as in 1) except that the amounts of the n-butyl lithium and the tetramethyl ethylene diamine were changed, polymerization was carried out so as to obtain a block copolymer.

Using the block copolymer solution, hydrogenation was carried out in the same manner as in 1) so as to produce Polymers 5 to 7. The polymer structures of the samples are shown in Table 1.

3) In the same manner as in 1) except that the amount of the tetramethyl ethylene diamine was increased and the polymerization temperature was 20°, polymerization was carried out so as to obtain a block copolymer having a 20% by weight styrene content, and a 85% by weight 1,2 vinyl bonding amount of the polybutadiene part.

Using the block copolymer solution, hydrogenation was carried out in the same manner as in 1) so as to produce Polymer 8. The polymer structure of the sample is shown in Table 1.

4) In the same manner as in 1) except that the styrene introduction amount and the butadiene introduction amount, and the amount of the n-butyl lithium and the tetramethyl ethylene diamine were changed, a block copolymer was obtained. Hydrogenation was carried out for the obtained block copolymer in the same manner as in 1) so as to produce Polymers 9 to 11. The polymer structures of the samples are shown in Table 1.

5) Into a 100 L capacity autoclave having an agitator and a jacket after washing, drying, and nitrogen displacement, a cyclohexane solution containing 10 parts by weight of a preliminarily purified butadiene was placed. Then, n-butyl lithium and tetramethyl ethylene diamine were added. After polymerizing at 70° C. for 1 hour, a cyclohexane solution containing 17.5 parts by weight of a preliminarily purified styrene was added. After polymerizing for 1 hour, a cyclohexane solution containing 55 parts by weight of a preliminarily purified butadiene was added, and followed by 1 hour polymerization. Thereafter, a cyclohexane solution containing 17.5 parts by weight of a styrene was further added, and polymerization was carried out for 1 hour.

Then, hydrogenation was carried out in the same manner as in 1) so as to produce Polymer 12. The polymer structure of the obtained sample is shown in Table 1.

6) In the same manner as in 5) except that the amounts of the n-butyl lithium and the tetramethyl ethylene diamine were changed, polymerization was carried out so as to obtain a block copolymer. Thereafter, hydrogenation was carried out in the same manner as in 1) so as to produce Polymers 13 and 14. The polymer structures of the samples are shown in Table 1.

7) Into a 100 L capacity autoclave having an agitator and a jacket after washing, drying, and nitrogen displacement, a cyclohexane solution containing 15 parts by weight of a preliminarily purified styrene was placed. Then, n-butyl lithium and tetramethyl ethylene diamine were added. After polymerizing at 70° C. for 1 hour, a cyclohexane solution containing 70 parts by weight of a preliminarily purified isoprene was added, and followed by 1 hour polymerization. Furthermore, a cyclohexane solution containing 15 parts by weight was added, and followed by 1 hour polymerization.

Next, using the block copolymer solution, hydrogenation was carried out at a 70° C. temperature with a di-p-trisbis (1-cyclopenta dienyl)titanium and a dibutyl magnesium as the hydrogenation catalyst so as to obtain Polymer 15. The polymer structure of the obtained polymer is shown in Table 1.

8) Into a 100 L capacity autoclave having an agitator and a jacket after washing, drying, and nitrogen displacement, a cyclohexane solution containing 6.5 parts by weight of a preliminarily purified styrene was placed. Then, n-butyl lithium and tetramethyl ethylene diamine were added. After polymerizing at 70° C. for 1 hour, a cyclohexane solution containing 87 parts by weight of a preliminarily purified butadiene was further added, and followed by 1 hour polymerization.

Thereafter, hydrogenation was carried out in the same manner as in 1) so as to produce Polymers 16 and 17. The polymer structures of the samples are shown in Table 1.

9) In the same manner as in 8) except that the amount of the n-butyl lithium and the tetramethyl ethylene diamine were changed, polymerization was carried out so as to obtain a block copolymer. Thereafter, hydrogenation was carried out in the same manner as in 1) so as to produce Polymers 18, 19. The polymer structure of the sample is shown in Table 1.

(2) Polyolefin Based Resin
(2-1) Commercially available polypropylene resin: MK711 (produced by Montel SDK Sunrise Corp.) <block PP>
(2-2) Commercially available polypropylene resin: PC600S (produced by Montel SDK Sunrise Corp.) <homo PP>
(2-3) Commercially available high density polyethylene resin: Suntek J301 (produced by Asahi Kasei Corp.)
(3) Talc: Micro Ace P-4 (produced by Nihon Talc Corp.)
(II) Preparation of the Resin Composition and the Physical Property Measurement
<Impact Resistant Resin Composition>

Components (1), (2) and (3) provided by the ratios shown in Table 2 were melt-kneaded at a 220° C. temperature using a 30 mm two axes extruder so as to be pelletized. The obtained pellets were injection-molded at 220° C., and the various characteristics of the following 1) to 5) were measured.

The measurement standards for the physical properties and the testing methods shown in the Examples and the Comparative Examples are as shown below.
1) Processability: In accordance with JIS K6758, the melt flow (230° C., 2.16 kg load) of the resin composition pellets was measured for providing an index.
2) Rigidity: In accordance with ASTM D790, a bending test was executed for the injection-molded test pieces for measuring the bending elastic modulus.
3) Impact resistance: In accordance with JIS K7110, the Izod impact strength (with notch) at −30° C. was measured.

4) Tensile elongation: In accordance with ASTM D638, the tensile breaking point elongation of the injection-molded test pieces was measured. The tensile rate was 20 mm/minute.
5) Thermal resistant aging property: The state of the injection-molded test pieces of the resin composition was adjusted under a 135° C. temperature for 200 hours. Thereafter, the tensile breaking point elongation was measured in the same manner as in 4) for finding out the sustaining ratio with respect to the elongation of a sample without the state adjustment. With a higher sustaining ratio, it was judged that the thermal resistant aging property is superior.

The results of the following Examples 1 to 4 and Comparative Examples 1 to 11 are shown in Table 2.

Examples 1 to 4 and Comparative Examples 1 to 11

Table 2 shows the physical properties of the resin compositions containing 10 parts by weight of a hydrogenated block copolymer as component (1), 80 parts by weight of a polypropylene and 10 parts by weight of talc as (2-1) of component (2) of Example 1 and Comparative Examples 1 to 7. Moreover, the same table shows the physical properties of the resin compositions containing 15 parts by weight of a hydrogenated block copolymer as component (1), and 65 parts by weight of a polypropylene and 20 parts by weight of talc as (2-1) of component (2) of Examples 2 to 4 and Comparative Examples 8 to 11.

It is observed that the resin compositions of the present invention are compositions having an excellent balance among low temperature impact resistance, molding processability (flowability), thermal resistant aging property, and rigidity.

Example 5

Physical properties of a thermoplastic resin composition containing 10 parts by weight of Polymer 3 hydrogenated block copolymer as component (1), and 90 parts by weight of a high density polyethylene resin as (2-3) of component (2) were produced. The obtained resin composition was a composition having an excellent balance among low temperature impact resistance, molding processability (flowability), thermal resistant aging property, and rigidity.

<Soft Resin Composition>

Component (1) and component (2-2) provided by the ratios shown in Table 3 were processed into a sheet by melt-kneading at a 230° C. temperature using a 30 mm single axis extruder. Using the obtained sheet (80 $\mu$m), the various characteristics of the following 1) to 3) were measured.

The measurement standards for the physical properties and the testing methods shown in the Examples and the Comparative Examples are as shown below.
1) Processability: In accordance with JIS K6758, the melt flow rate (230° C., 2.16 kg load) of the resin composition sheets was measured. With a large value, it was judged that the processability is superior.
2) Softness: In accordance with JIS K7127, a tensile test was executed by a 2 mm/minute tensile rate. The sheets were cut out into a 20 mm width×200 mm length, and measurement was carried out with the tensile elastic modulus at the time of the 300% elongation as the M300%. With a small value, it was judged that the softness is superior.
3) Transparency: In accordance with JIS K7105, the haze was measured using a haze meter (produced by Nihon Denshoku). With a small value, it was judged that the transparency is superior. Results of the following Example 6 and Comparative Examples 12 to 15 are shown in Table 3.

Examples 6 and Comparative Examples 12 to 15

Table 3 shows the physical properties of the thermoplastic resin compositions containing 20 parts by weight of a hydrogenated block copolymer as component (1), and 80 parts by weight of a polypropylene as (2-2) of component (2) of Example 6 and Comparative Examples 13 to 15. Moreover, it shows the physical properties of the resin composition containing 100% by weight of a polypropylene as (2-2) of Example 12.

It is observed that the resin compositions of the present invention are excellent in terms of softness, transparency and molding processability (flowability).

2. Viscous Adhesive Composition (I) Components to be Used, and Production Thereof
(1) Block Copolymer
Analysis of the Block Copolymer
The block copolymer was analyzed according to the following method.
1) Styrene content: Calculated from the absorption strength at 262 nm measured using an ultraviolet ray spectrophotometer (Hitachi UV200).
2) Peak molecular weight and composition ratio: The GPC comprises a device produced by Waters, and three columns as a combination of two sets of ZORBAX PSM1000-S, and PSM60-S produced by Dupont Corp. As the solvent, a tetrahydrofuran was used, and the measurement condition included a 35° C. temperature. As to the peak molecular weight, the chromatogram peak molecular weight was found out using a calibration curve (produced using the peak molecular weight of a standard polystyrene) calculated based on measurement of a commercially available standard polystyrene. Moreover, in the case component (1) contains both component (1-A) and component (1-B), the composition ratio was calculated from the area ratio of each peak in the chromatogram.
3) Vinyl bond and Hydrogenation ratio:
Measured using a nuclear magnetic resonance device (produced by BRUKER Corp., DPX-400).
Preparation of the Block Copolymer
The hydrogenated block copolymer used for the viscous adhesive composition was produced by the following method.
1) Into a 100 L capacity autoclave having an agitator and a jacket after washing, drying, and nitrogen displacement, a cyclohexane solution containing 10 parts by weight of a preliminarily purified styrene was placed. Then, n-butyl lithium and tetramethyl ethylene diamine were added. After polymerizing at 70° C. for 1 hour, polymerization was carried out for further 1 hour after adding a cyclohexane solution containing 80 parts by weight of a preliminarily purified butadiene, and still further 1 hour after adding a cyclohexane solution containing 10 parts by weight of a styrene.

A part of the obtained block copolymer solution was sampled. 0.3 part by weight of an octadecyl-3-(3,5-di-t-butyl-4-hydroxy phenyl)propionate was added to 100 parts by weight of the block copolymer, and thereafter the solvent was eliminated by heating (the obtained copolymer is referred to as Polymer 20). Polymer 20 has a 20% by weight styrene content, a 50% by weight 1,2 vinyl bonding amount of the polybutadiene part, and a 105,000 molecular weight.

Next, using the remaining block copolymer solution, hydrogenation was carried out at a 70° C. temperature with a di-p-trisbis(1-cyclopenta dienyl)titanium and n-butyl lithium as the hydrogenation catalyst. A part of the polymer solution was sampled so as to obtain Polymer 21. Polymer 21 has a 40% total hydrogenation ratio H of the unsaturated double bond based on the butadiene (hereinafter referred to as the hydrogenation ratio H), and a 73% hydrogenation ratio of the vinyl bond. The hydrogenation ratio H was controlled by measuring the supplied hydrogen gas amount by a flow meter, and stopping the gas supply at the time the targeted hydrogenation ratio was achieved. Hydrogenation was carried out again for the remaining polymer solution so as to obtain the copolymer solutions of Polymers 22 to 24.

In the same manner as in the case of Polymer 20, the solvent of each copolymer solution was eliminated by heating after adding a stabilizer. The characteristics of each sample are shown in Table 4.

2) In the same manner as in 1) except that the amounts of the n-butyl lithium and the tetramethyl ethylene diamine were changed, polymerization was carried out so as to obtain a block copolymer having a 20% by weight styrene content, and a 14% by weight 1,2 vinyl bonding amount of the polybutadiene part.

Using the block copolymer solution, hydrogenation was carried out in the same manner as in 1) so as to produce Polymer 25. The characteristics of the sample are shown in Table 4.

3) In the same manner as in 1) except that the amount of the tetramethyl ethylene diamine was increased and the polymerization temperature was 20° C., polymerization was carried out so as to obtain a block copolymer having a 20% by weight styrene content, and a 85% by weight 1,2 vinyl bonding amount of the polybutadiene part.

Using the block copolymer solution, hydrogenation was carried out in the same manner as in 1) so as to produce Polymer 26. The characteristics of the sample are shown in Table 4.

4) In the same manner as in 1) except that the styrene introduction amount and the butadiene introduction amount, and the amount of the n-butyl lithium and the tetramethyl ethylene diamine were changed, a block copolymer was obtained in the same manner as in 1). Hydrogenation was carried out for the obtained block copolymer in the same manner as in 1) so as to produce Polymers 27 to 29. The characteristics of the samples are shown in Table 4.

5) Into a 100 L capacity autoclave having an agitator and a jacket after washing, drying, and nitrogen displacement, a cyclohexane solution containing 10 parts by weight of a preliminarily purified butadiene was placed. Then, n-butyl lithium and tetramethyl ethylene diamine were added. After polymerizing at 70° C. for 1 hour, a cyclohexane solution containing 17.5 parts by weight of a preliminarily purified styrene was added. After polymerizing for 1 hour, a cyclohexane solution containing 55 parts by weight of a preliminarily purified butadiene was added, and followed by 1 hour polymerization. Thereafter, a cyclohexane solution containing 17.5 parts by weight of a styrene was further added, and polymerization was carried out for 1 hour.

Then, hydrogenation was carried out in the same manner as in 1) so as to produce Polymer 30. The characteristics of the obtained sample are shown in Table 4.

6) In the same manner as in 5) except that the amounts of the n-butyl lithium and the tetramethyl ethylene diamine were changed, polymerization was carried out so as to obtain a block copolymer. Thereafter, hydrogenation was carried out in the same manner as in 1) so as to produce Polymers 31 and 32. The characteristics of the obtained samples are shown in Table 4.

7) Into a 100 L capacity autoclave having an agitator and a jacket after washing, drying, and nitrogen displacement, a cyclohexane solution containing 30 parts by weight of a preliminarily purified styrene was placed. Then, n-butyl lithium and tetramethyl ethylene diamine were added. After polymerizing at 70° C. for 1 hour, a cyclohexane solution containing 70 parts by weight of a preliminarily purified butadiene was added, and followed by 1 hour polymerization. Furthermore, a phenyl methyl dichlorosilane was added as a coupling agent for coupling so as to obtain a mixture of a coupled polymer and an uncoupled polymer.

Thereafter, hydrogenation was carried out in the same manner as in 1) so as to produce Polymers 33 and 34. The characteristics of the obtained samples are shown in Table 4.

8) Into a 100 L capacity autoclave having an agitator and a jacket after washing, drying, and nitrogen displacement, a cyclohexane solution containing 35 parts by weight of a preliminarily purified styrene was placed. Then, n-butyl lithium and tetramethyl ethylene diamine were added. After polymerizing at 70° C. for 1 hour, a cyclohexane solution containing 65 parts by weight of a preliminarily purified butadiene was added, and followed by 1 hour polymerization. Furthermore, a silica tetrachloride was added as a coupling agent for coupling so as to obtain a mixture of a coupled polymer and an uncoupled polymer.

Thereafter, hydrogenation was carried out in the same manner as in 1) so as to produce Polymers 35 and 36. The characteristics of the obtained samples are shown in Table 4.

9) According to the method disclosed in JP-B-5-69874, the specific hydrogenated block copolymer (Polymer 37) disclosed in the example 3 of the gazette was obtained. Polymer 37 has a 20% by weight styrene content, a 35% by weight 1,2 vinyl bonding amount of the polybutadiene part, a 45% hydrogenation ratio H, and a 80% hydrogenation ratio of the vinyl bond.

10) Into a 100 L capacity autoclave having an agitator and a jacket after washing, drying, and nitrogen displacement, a cyclohexane solution containing 15 parts by weight of a preliminarily purified styrene was placed. Then, n-butyl lithium and tetramethyl ethylene diamine were added. After polymerizing at 70° C. for 1 hour, a cyclohexane solution containing 80 parts by weight of a preliminarily purified isoprene was added, and followed by 1 hour polymerization. Furthermore, a cyclohexane solution containing 15 parts by weight of a styrene was added, and followed by 1 hour polymerization. The obtained block copolymer has a 30% by weight styrene content, and a 40% by weight vinyl bonding total amount of the polyisoprene part.

Next, using the block copolymer solution, hydrogenation was carried out at a 70° C. temperature with a di-p-trisbis (1-cyclopenta dienyl)titanium and a dibutyl magnesium as the hydrogenation catalyst so as to obtain Polymer 38. Polymer 38 has a 55% hydrogenation ratio H, a 95% hydrogenation ratio of the vinyl bond, and a 120,000 molecular weight.

(2) Adhesion-imparting Agent
(2-1) Commercially available alicyclic petroleum resin: Arcon M100 (produced by Arakawa Kagaku Corp.)
(2-2) Commercially available aliphatic petroleum resin: Escolets 1310 (produced by Esso Corp.)
(3) Paraffin based process oil: PW-90 (produced by Idemitsu Kosan Corp.)
(II) Physical Property Measurement of the Viscous Adhesive Composition The measurement standards for the viscous adhesive composition and the testing methods in the examples and the comparative examples are as shown below.

1) Melt Viscosity

The melt viscosity at 160° C. of the viscous adhesive composition was measured by a Brook Field type viscometer.

2) Softening Point

In accordance with JIS-K2207, a defined ring filled with a specimen was supported horizontally in water. With a 3.5 g ball placed on the center of the specimen, the liquid temperature was raised at a 5° C./min rate for measuring the temperature at which the specimen comes in contact with the bottom plate of the ring base by the weight of the ball.

3) Melt Viscosity Change Ratio

The following melt viscosity change ratio as the scale for the thermal stability was calculated with the premise that the melt viscosity at 180° C. measured by a Brook Field type viscometer, of the viscous adhesive composition immediately after kneading is $\eta 0$, and the melt viscosity at 180° C. after leaving the viscous adhesive composition in a 180° C. temperature atmosphere for 48 hours is $\eta 1$.

$$\text{Melt viscosity change ratio (\%)} = \frac{\eta 1 - \eta 0}{\eta 0} \times 100$$

Next, the viscous adhesive composition taken out in the molten state was coated on a polyester film by a 50 micron meter thickness by an applicator for producing an adhesive tape sample. The viscous adhesion characteristics were measured by the following methods.

4) Loop Tack

With a 250 mm length×15 mm width loop-like specimen and a stainless steel plate as a member to be adhered used, it was measured under conditions of a contact area of 15 mm×50 mm, an adhesion time of 3 sec, and an adhesion and peeling rate 500 mm/min.

5) Adhesive Power

With a 25 mm width specimen attached on a stainless steel plate, the 180 degree peeling force was measured at a peeling rate of 300 mm/min.

6) Retentivity:

In accordance with JIS Z-1524, the adhesive tape was attached on a stainless steel plate so as to be contacted by a 25 mm×25 mm area. A 1 kg load was applied at 60° C., and the time needed for having the adhesive tape slipping off was measured as the retentivity.

The results of the following Examples 7–8 and 10–17 and Comparative Examples 16 to 27 are shown in Table 5.

Exampls 7–8 and 10–14 and Comparative Examples 16 to 24

With respect to 100 parts by weight of the block copolymer of component (1), 250 parts by weight of (2-1) as the adhesion-imparting agent of component (2), and 60 parts by weight of a paraffin based process oil PW-90 as a softener were provided by the composition ratio. They were melt-kneaded in a 1 litter container having an agitator so as to obtain a hot melt type viscous adhesive composition. To the viscous adhesive composition, 1 part by weight of a 2-t-butyl-6-(3-t-butyl-2-hydroxy-5-methyl benzyl)-4-methyl phenyl acrylate as a stabilizer was added with respect to 100 parts by weight of the block copolymer. The physical property measurement results of the adhesive composition are shown in Table 5.

As it is apparent from Table 5, it is observed that the viscous adhesive compositions in a range specified by the present invention have good melt viscosity, softening point, loop tack, adhesive power and retentivity as well as a small melt viscosity change ratio so as to provide well-balanced viscous adhesion characteristics.

Examples 15 to 17 and Comparative Examples 25, 26

In the same manner as in Example 7 except that the amounts of the adhesion-imparting agent and the softener were changed, a viscous adhesive composition was produced. The viscous adhesion characteristics thereof are shown in Table 5.

Examples 18 and 20–21

In the same manner as in Example 7 except that Escolets 1310 of (2-2) was used as the adhesion-imparting agent of component (2), a viscous adhesive composition was produced. The viscous adhesion characteristics thereof are shown in Table 6.

Comparative Example 27

In the same manner as in Example 7 except that Polymer 37 was used as the block copolymer, a viscous adhesive composition was produced. Since the obtained viscous adhesive composition does not satisfy the condition specified in the present invention in terms of the hydrogenation ratio of the vinyl bond, the melt viscosity change ratio was large compared with Example 7 and Example 9 so that it has a poor long term storage stability under a high temperature.

Example 22

In the same manner as in Example 18 except that Polymer 38 was used as the block copolymer, a viscous adhesive composition was produced. The obtained viscous adhesive composition has good melt viscosity, softening point, loop tack, adhesive power and retentivity as well as a small melt viscosity change ratio so as to provide well-balanced viscous adhesion characteristics.

TABLE 1 example/comparative example sample list

| Sample number | Styrene content (% by weight) | Vinyl bonding amount V in the conjugate diene (%) | Molecular weight (ten thousand) | Hydrogenation ratio H (%) | Vinyl bond hydrogenation ratio (%) | Melt flow (g/10 minutes) |
|---|---|---|---|---|---|---|
| Polymer 1 | 20 | 50 | 8.9 | 0 | 0 | 120 |
| Polymer 2 | 20 | 50 | 8.9 | 40 | 73 | 90 |
| Polymer 3 | 20 | 50 | 8.9 | 65 | 98 | 40 |
| Polymer 4 | 20 | 50 | 8.9 | 97 | 100 | 12 |
| Polymer 5 | 20 | 20 | 8.7 | 50 | 99 | 20 |
| Polymer 6 | 20 | 38 | 9.1 | 80 | 99 | 8.5 |
| Polymer 7 | 20 | 65 | 10.7 | 60 | 80 | 18 |

TABLE 1-continued example/comparative example sample list

| Sample number | Styrene content (% by weight) | Vinyl bonding amount V in the conjugate diene (%) | Molecular weight (ten thousand) | Hydrogenation ratio H (%) | Vinyl bond hydrogenation ratio (%) | Melt flow (g/10 minutes) |
|---|---|---|---|---|---|---|
| Polymer 8  | 20 | 85 | 12.3 | 60 | 67  | 25   |
| Polymer 9  | 30 | 45 | 9.3  | 61 | 96  | 20   |
| Polymer 10 | 0  | 45 | 12.8 | 62 | 97  | 17   |
| Polymer 11 | 70 | 45 | 7.1  | 60 | 95  | 15   |
| Polymer 12 | 35 | 60 | 8.1  | 75 | 96  | 22   |
| Polymer 13 | 35 | 60 | 16.2 | 75 | 95  | 0.3  |
| Polymer 14 | 35 | 60 | 4.7  | 75 | 95  | 150  |
| Polymer 15 | 30 | 50 | 8.6  | 70 | 98  | 30   |
| Polymer 16 | 13 | 62 | 15.4 | 75 | 98  | 11   |
| Polymer 17 | 13 | 62 | 15.4 | 98 | 100 | 3.8  |
| Polymer 18 | 13 | 65 | 15   | 55 | 70  | 32   |
| Polymer 19 | 13 | 38 | 14.8 | 70 | 96  | 0.8  |

TABLE 2 physical properties of thermoplastic resin compositions

| | Composition amount (% by weight) | | Kind of component | Melt flow | Bending elastic modulus | Izod (−30° C.) | Tensile breaking point | Thermal resistant aging property sustaining ratio |
|---|---|---|---|---|---|---|---|---|
| | Component (1) | Component (2-1) | (1) | (g/10 minutes) | Mpa | J/m | elongation | (%) |
| Example 1    | 11.1 | 88.9 | Polymer 3  | 31 | 1800 | 47 | 80  | 60 |
| Com. Ex. 1   | 11.1 | 88.9 | Polymer 1  | 35 | 1500 | 38 | 30  | 15 |
| Com. Ex. 2   | 11.1 | 88.9 | Polymer 2  | 33 | 1600 | 45 | 60  | 40 |
| Com. Ex. 3   | 11.1 | 88.9 | Polymer 4  | 27 | 1800 | 38 | 60  | 70 |
| Com. Ex. 4   | 11.1 | 88.9 | Polymer 5  | 29 | 1700 | 37 | 40  | 60 |
| Com. Ex. 5   | 11.1 | 88.9 | Polymer 6  | 25 | 1800 | 39 | 40  | 60 |
| Com. Ex. 6   | 11.1 | 88.9 | Polymer 7  | 28 | 1650 | 40 | 50  | 50 |
| Com. Ex. 7   | 11.1 | 88.9 | Polymer 8  | 29 | 1650 | 36 | 50  | 40 |
| Example 2    | 18.7 | 81.3 | Polymer 9  | 26 | 1550 | 60 | 90  | 55 |
| Com. Ex. 8   | 18.7 | 81.3 | Polymer 10 | 25 | 1100 | 40 | 40  | 35 |
| Com. Ex. 9   | 18.7 | 81.3 | Polymer 11 | 24 | 1800 | 32 | 40  | 50 |
| Example 3    | 18.7 | 81.3 | Polymer 12 | 27 | 1950 | 51 | 100 | 65 |
| Com. Ex. 10  | 18.7 | 81.3 | Polymer 13 | 12 | 1650 | 42 | 70  | 60 |
| Com. Ex. 11  | 18.7 | 81.3 | Polymer 14 | 33 | 1800 | 37 | 60  | 60 |
| Example 4    | 18.7 | 81.3 | Polymer 15 | 28 | 1550 | 55 | 80  | 55 |

(Note 1) Composition ratio of thermoplastic resin compositions:
Example 1 and Comparative Examples 1 to 7: component (1)/component (2-1: MK711)/talc = 10/80/10
Examples 2 to 4 and Comparative Examples 8 to 11: component (1)/component (2-1: MK711)/talc = 15/65/20

TABLE 3 physical properties of thermoplastic resin compositions

| | Composition amount (% by weight) | | Kind of component (1) | Melt flow (g/10 minutes) | M300 % (kg/cm2f) | Haze (%) |
|---|---|---|---|---|---|---|
| | Component (1) | Component (2-2) | | | | |
| Example 6 | 20 | 80 | Polymer 16 | 7.4 | 135 | 6 |
| Comparative Example 12 | 0 | 100 | — | 7 | 175 | 13 |
| Comparative Example 13 | 20 | 80 | Polymer 17 | 6.4 | 135 | 13 |
| Comparative Example 14 | 20 | 80 | Polymer 18 | 8.2 | 140 | 15 |
| Comparative Example 15 | 20 | 80 | Polymer 19 | 5.8 | 150 | 24 |

(Note 1) Composition ratio of thermoplastic resin comnpositions:
Example 6 and Comparative Examples 13 to 15: component (1)/component (2-2: PC600S) = 20/80
Comparative Example 12: component (2-2: PC600S) = 100

TABLE 4 example/comparative example sample list

| Sample number | Styrene content (% by weight) | Vinyl bonding amount V in the conjugate diene (%) | Hydrogenation ratio H (%) | Vinyl bond hydrogenation ratio (%) | Peak molecular weight (ten thousand) | (1-A)/(1-B) ratio |
|---|---|---|---|---|---|---|
| Polymer 20 | 20 | 50 | 0 | 0 | 10.5 | |
| Polymer 21 | 20 | 50 | 40 | 73 | 10.5 | |
| Polymer 22 | 20 | 50 | 60 | 97 | 10.5 | |
| Polymer 23 | 20 | 50 | 70 | 99 | 10.5 | |
| Polymer 24 | 20 | 50 | 93 | 100 | 10.5 | |
| Polymer 25 | 20 | 14 | 55 | 94 | 10 | |
| Polymer 26 | 20 | 85 | 60 | 67 | 10.5 | |
| Polymer 27 | 30 | 36 | 46 | 98 | 9 | |
| Polymer 28 | 0 | 36 | 46 | 98 | 9 | |
| Polymer 29 | 70 | 36 | 46 | 97 | 9 | |
| Polymer 30 | 35 | 65 | 75 | 96 | 15 | |
| Polymer 31 | 35 | 65 | 73 | 95 | 3 | |
| Polymer 32 | 35 | 65 | 75 | 95 | 35 | |
| Polymer 33 | 30 | 40 | 45 | 95 | 6.9/13.1 | 70/30 |
| Polymer 34 | 30 | 40 | 70 | 97 | 6.9/13.1 | 70/30 |
| Polymer 35 | 35 | 50 | 55 | 96 | 6.0/19.5 | 50/50 |
| Polymer 36 | 35 | 50 | 65 | 98 | 6.0/19.6 | 50/50 |

TABLE 5 characteristics of viscous adhesive compositions

| | Composition amount (% by weight) | | | Kind of component (1) | Melt viscosity (cP.at. 160° C.) | Softening point (° C.) | Loop tack (gf) | Adhesive power (gf/10 mm) | Retentivity (minute) | Melt viscosity change ratio |
|---|---|---|---|---|---|---|---|---|---|---|
| | Component (1) | Component (2-1) | Component (3) | | | | | | | |
| Example 7 | 100 | 250 | 60 | Polymer 22 | 3,200 | 79.0 | | 1,580 | 4.3 | −23 |
| Example 8 | 100 | 250 | 60 | Polymer 23 | 5,120 | 84.3 | | 1,560 | 4.7 | −25 |
| Com. Ex. 16 | 100 | 250 | 60 | Polymer 20 | 19,300 | *1 | | 1,940 | 1.9 | *1 |
| Com. Ex. 17 | 100 | 250 | 60 | Polymer 21 | 3,500 | 77.5 | | 1,690 | 3.5 | +42 |
| Com. Ex. 18 | 100 | 250 | 60 | Polymer 24 | 7,800 | 88.8 | | 1,400 | 10.5 | −11 |
| Com. Ex. 19 | 100 | 250 | 60 | Polymer 25 | 17,200 | 115.4 | | 300 | 100 | −31 |
| Com. Ex. 20 | 100 | 250 | 60 | Polymer 26 | 3,100 | 87.5 | | 760 | 4.0 | +65 |
| Com. Ex. 27 | 100 | 250 | 60 | Polymer 27 | 2,280 | 87.3 | 1,060 | 1,610 | 12.2 | −5 |
| Com. Ex. 21 | 100 | 250 | 60 | Polymer 28 | 28,000 | 65.3 | 320 | 230 | 0.2 | −15 |
| Com. Ex. 22 | 100 | 250 | 60 | Polymer 29 | 1,560 | 92.5 | 0 | 0 | 0 | −8 |
| Example 10 | 100 | 250 | 60 | Polymer 30 | 2,150 | 87.1 | 1,020 | 1,590 | 10.2 | −5 |
| Com. Ex. 23 | 100 | 250 | 60 | Polymer 31 | 1,480 | 74.0 | 1,070 | 1,510 | 1.4 | −4 |
| Com. Ex. 24 | 100 | 250 | 60 | Polymer 32 | 75,000 | 106.5 | 260 | 1,610 | 168 | −50 |
| Example 11 | 100 | 250 | 60 | Polymer 33 | 1,720 | 92.1 | 1,760 | 1,550 | 37.9 | −5 |
| Example 12 | 100 | 250 | 60 | Polymer 34 | 4,320 | 99.8 | 550 | 1,840 | 116 | −9 |
| Example 13 | 100 | 250 | 60 | Polymer 35 | 2,050 | 91.7 | 1,830 | 1,610 | 32.6 | −11 |
| Example 14 | 100 | 250 | 60 | Polymer 36 | 4,680 | 97.6 | 670 | 1,870 | 104 | −22 |
| Example 15 | 100 | 50 | 30 | Polymer 22 | 4,970 | 100.5 | 920 | 1,080 | 780 | −26 |
| Example 16 | 100 | 270 | 50 | Polymer 22 | 2,970 | 84.4 | 1,220 | 1,790 | 4.8 | −19 |
| Example 17 | 100 | 350 | 0 | Polymer 22 | 5,800 | 108.5 | 520 | 2,080 | 25.3 | −26 |
| Com. Ex. 25 | 100 | 10 | 20 | Polymer 22 | 14,800 | 118.0 | 800 | 330 | 114 | −62 |
| Com. Ex. 26 | 100 | 450 | 70 | Polymer 22 | 1,460 | 91.7 | 130 | 1,710 | 0.7 | −10 |

Component (1): Block copolymer
Component (2-1): Alicyclic petroleum resin (Arcon M100, produced by Arakawa Kagaku)
Component (3): Paraffin based process oil (PW-90, produced by Idemitsu Kosan)
*1 Measurement was impossible due to gelation

TABLE 6 characteristics of viscous adhesive compositions

| | Composition amount (% by weight) | | | Kind of component (1) | Melt viscosity (cP, at 160° C.) | Softening point (° C.) | Loop tack (gf) | Adhesive power (gf/10 mm) | Retentivity (minute) | Melt viscosity change ratio (%) |
|---|---|---|---|---|---|---|---|---|---|---|
| | Component (1) | Component (2-2) | Component (3) | | | | | | | |
| Example 18 | 100 | 250 | 60 | Polymer 22 | 2,600 | 90.4 | 1,560 | 1,380 | 4.1 | −12 |
| Comp. Ex. 28 | 100 | 250 | 60 | Polymer 27 | 2,640 | 105.2 | 960 | 1,520 | 25.3 | −18 |

TABLE 6-continued characteristics of viscous adhesive compositions

| | Composition amount (% by weight) | | | | Melt viscosity (cP, at 160° C.) | Softening point (° C.) | Loop tack (gf) | Adhesive power (gf/10 mm) | Retentivity (minute) | Melt viscosity change ratio (%) |
|---|---|---|---|---|---|---|---|---|---|---|
| | Component (1) | Component (2-2) | Component (3) | Kind of component (1) | | | | | | |
| Example 20 | 100 | 250 | 60 | Polymer 30 | 2,360 | 103.0 | 950 | 1,490 | 9.6 | −5 |
| Example 21 | 100 | 250 | 60 | Polymer 33 | 4,400 | 110.4 | 2,650 | 1,640 | 8.5 | −18 |

Component (1): Block copolymer
Component (2-2): Aliphatic petroleum resin (Escolets 1310, produced by Esso Kagaku)
Component (3): Paraffin based process oil (PW-90, produced by Idemitsu Kosan)

Industrial Applicability

The hydrogenated block copolymer of the present invention provides the excellent performance for improvement of a polyolefin based resin. Furthermore, the polyolefin based resin composition of the present invention has an excellent balance among impact resistance (in particular, the low temperature impact resistance), rigidity, molding processability and thermal resistant aging property. Moreover, a polyolefin based resin composition having excellent transparency, softness, and molding processability can also be obtained. Owing to these characteristics, it can be processed into molded products of various shapes by injection molding, extrusion molding, or the like so as to be used as automobile parts (automobile interior materials, automobile exterior materials), various containers such as food package containers, domestic electric appliances, medical device parts, industrial parts, toys, or the like.

Furthermore, the viscous adhesive composition of the present invention shows good melt viscosity, softening point, loop tack, adhesive power and retentivity as well as a small melt viscosity change ratio so as to provide an excellent balance performance in terms of the viscous adhesion characteristics. Owing to these characteristics, it can be utilized for various kinds of adhesive tapes and labels, pressure sensitive thin plates, pressure sensitive sheets, various kinds of backside glues for fixing lightweight plastic molded products, backside glues for fixing carpets, backside glues for fixing tiles, or the like. In particular, it is useful for adhesive tapes and labels.

What is claimed is:

1. A hydrogenated block copolymer, which is (1) a hydrogenation product of a block copolymer having at least one polymer block mainly comprising a vinyl aromatic hydrocarbon and at least one polymer block mainly comprising a conjugate diene compound, and having a vinyl bonding amount V (%) based on the conjugate diene compound of from not less than 37% to less than 70%, wherein (a) the total hydrogenation ratio H (%) of the unsaturated double bond based on the conjugate diene compound satisfies the following relational formulae:

$V < H < 1.25 \times V + 10$ $55 \leq H < 80$, and wherein (b) the hydrogenation ratio of the vinyl bond is 82% or more.

2. A block copolymer composition, comprising:
(1) the hydrogenated block copolymer according to claim 1, and
(2) a polyolefin based resin.

3. The block copolymer composition according to claim 2, comprising 1 to 50 parts by weight of component (1) and 99 to 50 parts by weight of component (2) with respect to 100 parts by weight of the total weight of components (1) and (2), wherein component (1) further satisfies the following conditions:

(c) the content of the vinyl aromatic hydrocarbon is 5 to 50% by weight, and
(d) the melt flow rate is 0.5 to 100 g/10 minutes.

4. The block copolymer composition according to claim 2, comprising 1 to 95 parts by weight of component (1) and 99 to 5 parts by weight of component (2) with respect to 100 parts by weight of the total weight of components (1) and (2), wherein component (1) further satisfies the following conditions:

(c) the content of the vinyl aromatic hydrocarbon is 5 to 35% by weight, and
(d) the number average molecular weight is from more than 30,000 to less than 330,000.

5. The block copolymer composition according to claim 2, comprising 20 to 95 parts by weight of component (1) and 80 to 5 parts by weight of component (2), each with respect to 100 parts by weight of the total weight of components (1) and (2), and 5 to 300 parts by weight of (3) a non-aromatic rubber softener and not more than 500 parts by weight of (4) an inorganic filler, each with respect to 100 parts by weight of component (1), wherein component (1) further satisfies the following conditions:

(c) the content of the vinyl aromatic hydrocarbon is 5 to 50% by weight, and
(d) the number average molecular weight is 50,000 to 1,000,000.

6. A block copolymer composition, comprising:
(1) 100 parts by weight of a hydrogenated block copolymer which is a hydrogenation product of a block copolymer having at least one polymer block mainly comprising a vinyl aromatic hydrocarbon and at least one polymer block mainly comprising a conjugate diene compound, and having a vinyl bonding amount V (%) based on the conjugate diene compound of from not less than 30% to less than 70%, wherein (a) the total hydrogenation ratio H (%) of the unsaturated double bond based on the conjugate diene compound satisfies the following relational formulae:

$V < H < 1.25 \times V + 10$ $55 \leq H < 80$, and wherein (b) the hydrogenation ratio of the vinyl bond is 82% or more, and (2) 20 to 400 parts by weight (with respect to 100 parts by weight of component (1)) of an adhesion-imparting agent.

7. The block copolymer composition according to claim 6, wherein component (1) further satisfies the following conditions:
- (c) the content of the vinyl aromatic hydrocarbon is 5 to 60% by weight, and
- (d) the peak molecular weight is 50,000 to 300,000.

8. A block copolymer composition, comprising:
- (1) 100 parts by weight of a hydrogenated block copolymer which is a hydrogenation product of a block copolymer having at least one polymer block mainly comprising a vinyl aromatic hydrocarbon and at least one polymer block mainly comprising a conjugate diene compound, and having a vinyl bonding amount V (%) based on the conjugate diene compound of from not less than 30% to less than 70%, wherein (a) the total hydrogenation ratio H (%) of the unsaturated double bond based on the conjugate diene compound satisfies the following relational formulae:

$$V<H<2\times V+10$$

$$30 \leq H < 80, \text{ and}$$

wherein (b) the hydrogenation ratio of the vinyl bond is 82% or more, and

- (2) 20 to 400 parts by weight (with respect to 100 parts by weight of component (1)) of an adhesion-imparting agent, wherein component (1) comprises:
- (1-A) 20 to 90% by weight of a hydrogenated block copolymer which is a hydrogenation product of a block copolymer having one polymer block mainly comprising a vinyl aromatic hydrocarbon and one polymer block mainly comprising a conjugate diene compound, and having a vinyl bonding amount V (%) based on the conjugate diene compound of not less than 30% to less than 70%, wherein (a) the total hydrogenation ratio H (%) of the unsaturated double bond based on the conjugate diene compound satisfies the following relational formulae:

$$V<H<2\times V+10$$

$$30 \leq H < 80,$$

wherein (b) the hydrogenation ratio of the vinyl bond is 82% or more, and wherein (c) the content of the vinyl aromatic hydrocarbon is 5 to 60% by weight; and

- (1-B) 80 to 10% by weight of a hydrogenated block copolymer which is a hydrogenation product of a block copolymer having at least two polymer blocks mainly comprising a vinyl aromatic hydrocarbon and at least one polymer block mainly comprising a conjugate diene compound, and having a vinyl bonding amount V (%) based on the conjugate diene compound of from not less than 30% to less than 70%, wherein (a) the total hydrogenation ratio H (%) of the unsaturated double bond based on the conjugate diene compound satisfies the following relational formulae:

$$V<H<2\times V+10$$

$$30 \leq H < 80,$$

wherein (b) the hydrogenation ratio of the vinyl bond is 82% or more, and wherein (c) the content of the vinyl aromatic hydrocarbon is 5 to 60% by weight, wherein the average molecular weight of component (1-A) and component (1-B) is 50,000 to 300,000.

* * * * *